United States Patent
Wallner

(10) Patent No.: US 8,196,688 B2
(45) Date of Patent: Jun. 12, 2012

(54) METHOD FOR CARRYING OUT A TRACTIVE-FORCE INTERRUPTED SHIFTING IN A PARALLEL HYBRID VEHICLE

(75) Inventor: Stefan Wallner, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 150 days.

(21) Appl. No.: 12/671,137

(22) PCT Filed: Aug. 8, 2008

(86) PCT No.: PCT/EP2008/060438
§ 371 (c)(1),
(2), (4) Date: Jan. 28, 2010

(87) PCT Pub. No.: WO2009/021911
PCT Pub. Date: Feb. 19, 2009

(65) Prior Publication Data
US 2010/0200318 A1    Aug. 12, 2010

(30) Foreign Application Priority Data
Aug. 16, 2007 (DE) .................. 10 2007 038 773

(51) Int. Cl.
*B60W 10/06* (2006.01)
*B60W 10/18* (2012.01)
(52) U.S. Cl. .......... 180/65.265; 180/65.275; 180/65.28; 180/65.285
(58) Field of Classification Search ..... 180/65.21–65.29
See application file for complete search history.

(56) References Cited

U.S. PATENT DOCUMENTS

| | | | |
|---|---|---|---|
| 4,021,712 A * | 5/1977 | Ishihara et al. | 318/432 |
| 5,890,392 A | 4/1999 | Ludanek et al. | |
| 6,059,059 A | 5/2000 | Schmidt-Brucken | |
| 6,077,186 A | 6/2000 | Kojima et al. | |
| 6,166,512 A | 12/2000 | Kojima | |
| 6,176,807 B1 | 1/2001 | Oba et al. | |
| 6,319,168 B1 | 11/2001 | Morris et al. | |
| 6,453,864 B1 * | 9/2002 | Downs et al. | 123/179.3 |
| 6,504,259 B1 | 1/2003 | Kuroda et al. | |
| 6,505,109 B1 | 1/2003 | Strandell et al. | |
| 6,506,139 B2 | 1/2003 | Hirt et al. | |
| 6,524,219 B2 | 2/2003 | Mesiti et al. | |
| 6,543,561 B1 | 4/2003 | Pels et al. | |
| 6,574,535 B1 | 6/2003 | Morris et al. | |
| 6,871,734 B2 | 3/2005 | Kupper et al. | |
| 6,887,184 B2 | 5/2005 | Buchannan et al. | |
| 6,938,713 B1 | 9/2005 | Tahara et al. | |
| 7,395,837 B2 | 7/2008 | Foster et al. | |
| 7,464,616 B2 | 12/2008 | Leibbrandt et al. | |

(Continued)

FOREIGN PATENT DOCUMENTS
DE    44 36 914 A1    5/1996
(Continued)

*Primary Examiner* — Jeffrey J Restifo
*Assistant Examiner* — Erez Gurari
(74) *Attorney, Agent, or Firm* — Davis & Bujold, P.L.L.C.

(57) ABSTRACT

A method of carrying out a shift operation with traction force interruption during hybrid operation when the electric machine has failed or the energy accumulator is full in a parallel hybrid vehicle having an automated transmission. During an upshift, the power inverter, connected to the electric machine, is actuated with an active short-circuit whereby a torque is generated, at the electric machine, which is used for synchronizing the transmission input.

3 Claims, 1 Drawing Sheet

U.S. PATENT DOCUMENTS

| | | |
|---|---|---|
| 7,500,932 B2 | 3/2009 | Katakura et al. |
| 7,622,883 B2 * | 11/2009 | Kaizuka et al. ............... 318/730 |
| 2003/0010548 A1 | 1/2003 | Mesiti et al. |
| 2005/0088123 A1 | 4/2005 | Wakitani et al. |
| 2005/0164827 A1 | 7/2005 | Beaty et al. |
| 2005/0209047 A1 | 9/2005 | Berger et al. |
| 2005/0221947 A1 | 10/2005 | Mesiti et al. |
| 2006/0113858 A1 | 6/2006 | Hino et al. |
| 2006/0199696 A1 | 9/2006 | Gouda et al. |
| 2007/0056783 A1 | 3/2007 | Joe et al. |
| 2007/0095584 A1 | 5/2007 | Roske et al. |
| 2007/0102211 A1 | 5/2007 | Nozaki et al. |
| 2007/0114081 A1 | 5/2007 | Iwanaka et al. |
| 2008/0036322 A1 | 2/2008 | Franke |
| 2008/0245332 A1 | 10/2008 | Rimaux et al. |
| 2009/0051309 A1 | 2/2009 | Rehm et al. |
| 2009/0146615 A1 | 6/2009 | Zillmer et al. |
| 2009/0223727 A1 | 9/2009 | Tolksdorf |

FOREIGN PATENT DOCUMENTS

| | | |
|---|---|---|
| DE | 196 31 983 C1 | 2/1998 |
| DE | 197 09 457 A1 | 9/1998 |
| DE | 198 14 402 A1 | 10/1999 |
| DE | 199 45 473 A1 | 4/2000 |
| DE | 199 39 334 A1 | 3/2001 |
| DE | 101 25 348 A1 | 1/2002 |
| DE | 103 40 529 A1 | 3/2004 |
| DE | 103 27 306 A1 | 1/2005 |
| DE | 10 2004 022 767 A1 | 7/2005 |
| DE | 600 22 593 T2 | 2/2006 |
| DE | 696 31 468 T2 | 6/2006 |
| DE | 10 2005 015 657 A1 | 10/2006 |
| DE | 10 2006 019 679 A1 | 11/2006 |
| DE | 10 2005 057 607 B3 | 4/2007 |
| DE | 10 2005 051 382 A1 | 5/2007 |
| DE | 11 2005 001 985 T5 | 5/2008 |
| EP | 1 167 834 A1 | 1/2002 |
| EP | 1 177 930 A2 | 2/2002 |
| EP | 1 219 493 A1 | 7/2002 |
| EP | 13 19 546 A1 | 6/2003 |
| EP | 1 450 074 A2 | 8/2004 |
| EP | 1 468 865 A2 | 10/2004 |
| EP | 1 527 927 A1 | 5/2005 |
| EP | 1 255 656 B1 | 3/2006 |
| EP | 1 714 817 A1 | 10/2006 |
| EP | 1 744 083 A2 | 1/2007 |
| EP | 1 762 417 A1 | 3/2007 |
| EP | 1 785 305 A2 | 5/2007 |
| FR | 2 722 738 A1 | 1/1996 |
| FR | 2 796 437 A1 | 1/2001 |
| FR | 2 892 471 A1 | 4/2007 |
| WO | 00/03163 A1 | 1/2000 |
| WO | 02/066343 A1 | 10/2002 |
| WO | 03/066367 A1 | 8/2003 |
| WO | 2004/111441 A1 | 12/2004 |
| WO | 2006/020476 A2 | 2/2006 |
| WO | 2006/053624 A1 | 5/2006 |

* cited by examiner

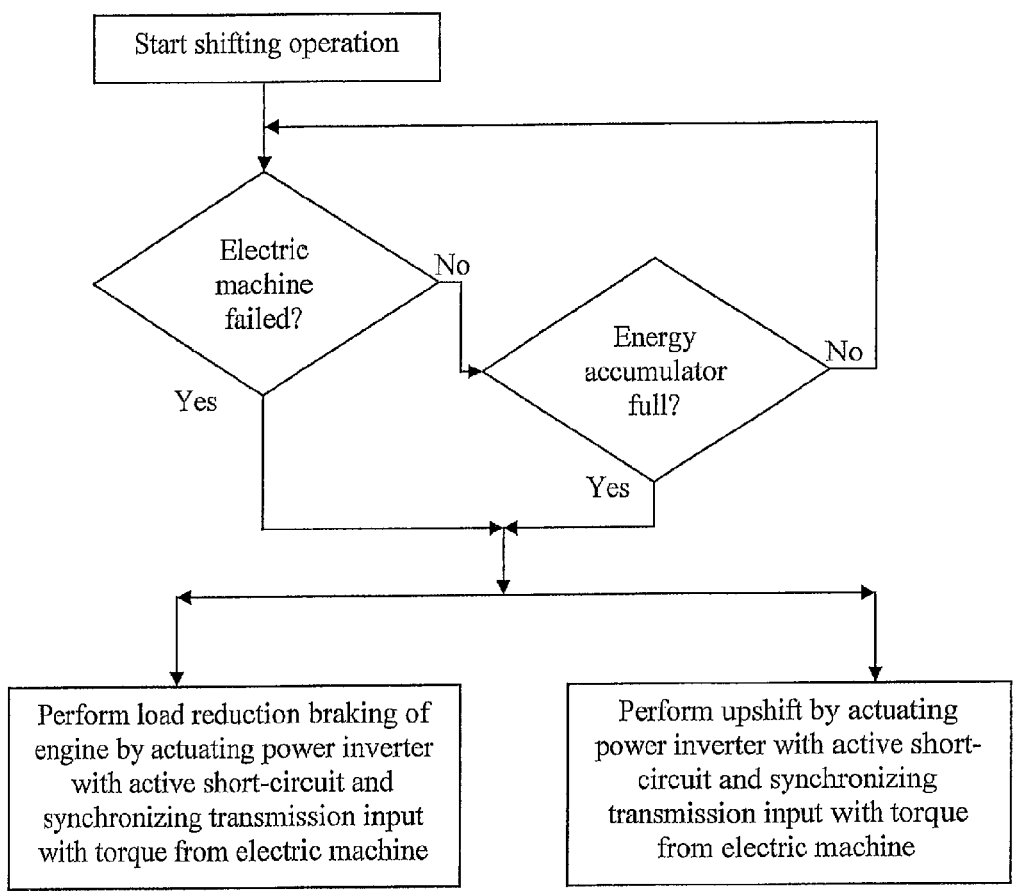

METHOD FOR CARRYING OUT A TRACTIVE-FORCE INTERRUPTED SHIFTING IN A PARALLEL HYBRID VEHICLE

This application is a National Stage completion of PCT/EP2008/060438 filed Aug. 8, 2008, which claims priority from German patent application serial no. 10 2007 038 773.5 filed Aug. 16, 2007.

FIELD OF THE INVENTION

The present invention relates to a method for carrying out a shift operation with interruption of the traction force during hybrid operation, in the event that the electric machine fails or that the energy accumulator is full, in a hybrid vehicle comprising an automated transmission.

BACKGROUND OF THE INVENTION

Hybrid vehicles that comprise a hybrid drive are known from the prior art. In addition to the internal combustion engine they comprise at least one electric machine. In serial hybrid vehicles a generator is driven by the internal combustion engine and the generator supplies electrical energy to the electric motor that drives the wheels. In addition, parallel hybrid vehicles are known, in which the torques of the internal combustion engine and at least one electric machine that can be connected to the internal combustion engine are added. In this case the electric machine can be connected to the belt drive or to the crankshaft of the internal combustion engine. The torques produced by the internal combustion engine and/or the at least one electric machine are transmitted to the driven axle by a downstream transmission.

For example, from DE 102006019679 A1 a drivetrain having an electrically adjustable hybrid transmission and an electro-hydraulic control system, several electric power units and several torque transmission mechanisms is known. In this, the torque transmission mechanisms can be selectively engaged by the electro-hydraulic control system in order to provide four forward gears, a neutral condition, an electric mode of operation with lower and higher speed, an electrically adjustable mode of operation with lower and higher speed, and an uphill operating mode.

From DE 102005057607 B3 a hybrid drive for vehicles is known, containing at least a main motor, in particular an internal combustion engine, a generator, an electric motor and a planetary transmission comprising a sun gear, a ring gear, a planetary gear carrier and planetary gears, which has at least one drive output shaft. In this case it is provided that for a first driving range of the vehicle, to add the torques, the output shafts of the main engine and the electric motor are coupled to the sun gear of the planetary transmission, and for a further driving range one of the two motors can be coupled with positive interlock to the ring gear of the planetary transmission for the mechanical addition of the speeds in accordance with the superposition principle.

In vehicles with an automated transmission, the transmission input must be free from load before a gear can be disengaged; furthermore, the transmission input must be synchronized before a new gear can be engaged.

According to the prior art, in hybrid vehicles with an automated transmission a shift operation with traction force interruption takes place during hybrid operation in that, in a first step, the load is removed at the internal combustion engine and the electric machine, and the internal combustion engine is then decoupled from the drivetrain by disengaging a clutch. When the internal combustion engine has been decoupled the old gear is disengaged, the speed of the electric machine is adjusted to the synchronous speed, the new gear is then engaged and the internal combustion engine is coupled, and finally the load on the internal combustion engine and the electric machine is built up again.

In a patent application by the present applicant with the same timing as the present application, a method is described for carrying out a shift operation with traction force interruption during hybrid operation in a parallel hybrid vehicle comprising an automated transmission, in which the internal combustion engine and the electric machine remain coupled to one another and the load is removed by operating the electric machine before the old gear has been disengaged and before synchronization to the new gear.

In this case it is proposed in particular, in order to remove the load before the old gear has been disengaged, to operate the electric machine in such manner that it compensates the torque of the internal combustion engine while the internal combustion engine is operated at constant torque during the load compensation, and only to act upon the torque of the internal combustion engine if it exceeds a threshold value or if the electric accumulator of the vehicle would become too fully charged by the electric machine due to the load compensation. When the load has been removed the old gear is disengaged and synchronization to the new gear is carried out by adjusting the speed of the electric machine to the synchronous speed of the new gear. The speed adjustment of the electric machine is preferably carried out in a speed regulation mode to which the electric machine is changed, with the torque of the internal combustion engine serving as a pilot torque for the speed regulation of the electric machine.

With the method described, if the electric machine fails or the energy accumulator of the hybrid vehicle is fully charged the situation can arise that in upshifts, in particular traction upshifts, it is no longer possible to remove the load or synchronize the transmission input. As a result the shift operation takes a very long time, and this is unacceptable for reasons of both comfort and driving safety.

Furthermore, delays can also occur during a downshift when the electric machine is not available.

SUMMARY OF THE INVENTION

The purpose of the present invention is to indicate a method for carrying out a shift operation during hybrid operation in a parallel hybrid vehicle comprising an automated transmission when the electric machine has failed or when the energy accumulator is full, by virtue of which method it remains possible to drive the vehicle despite the failure of the electric machine.

BRIEF DESCRIPTION OF THE DRAWING

The sole drawing diagrammatically shows the method for carrying out the shift operation according to the invention.

DETAILED DESCRIPTION OF THE PREFERRED EMBODIMENTS

The sole drawing diagrammatically shows the various steps for carrying out the a shift operation of the invention and further details concerning the same are provided below.

According to the claims it is proposed that in an upshift, especially a traction upshift, if the energy accumulator is full or the electric machine has failed, the power inverter connected to the electric machine should be actuated with an active short-circuit. In the short-circuited condition a torque is generated at the electric machine, which according to the invention is used to synchronize the transmission input.

For the case of a downshift, it is proposed to synchronize the transmission input by appropriate control of the internal combustion engine, during which the internal combustion engine can be coupled to the electric machine connected to the transmission input.

When, during the load reduction for disengaging the old gear, the internal combustion engine is coupled to the electric machine, the internal combustion engine is braked for the load reduction, again by actuating the power inverter connected to the electric machine with an active short-circuit, so that a torque is produced at the electric machine which is used to brake the transmission input. During this the internal combustion engine can be operated with constant torque.

The concept according to the invention provides a method by virtue of which it remains possible to drive a parallel hybrid vehicle with an automated transmission even if the electric machine has failed or is not available.

The invention claimed is:

1. A method of carrying out a shift operation, when one of an electric machine has failed or an energy accumulator is full, in a parallel hybrid vehicle having an automated transmission with traction force interruption during hybrid operation, the method comprising the steps of:
   during an upshift, generating torque with the electric machine for synchronizing a transmission input by connecting a power inverter, which is actuated with an active short-circuit, to the electric machine; and
   braking an internal combustion engine, for load reduction, by actuating the power inverter with an active short-circuit and which is connected to the electric machine, if the internal combustion engine is coupled to the electric machine during the load reduction, to synchronize a transmission input with a torque generated by the electric machine.

2. A method of shifting an automated transmission parallel hybrid vehicle with traction force interruption during hybrid operation when either an electric machine has failed or an energy accumulator is full, the hybrid vehicle comprising an internal combustion engine coupled to the electric machine, a power inverter being coupled to the electric machine, and the automated transmission being coupled, via a transmission input, to the electric machine, the method comprising the steps of:
   upshifting the automated transmission by actuating the power inverter with an active short-circuit to generate torque with the electric machine for synchronizing the transmission input;
   coupling the internal combustion engine with the electric machine and appropriately controlling the internal combustion engine to synchronize the transmission input for downshifting the automated transmission; and
   braking the internal combustion engine to reduce torque, via the electric machine, on the transmission input and a currently engaged gear by actuating the power inverter with an active short-circuit to synchronize the transmission input with torque generated at the electric machine, if the internal combustion engine is coupled to the electric machine.

3. The method of carrying out a shift operation according to claim 2, further comprising the step of braking the internal combustion engine, for load reduction, by actuating the power inverter with an active short-circuit and which is connected to the electric machine, if the internal combustion engine is coupled to the electric machine during the load reduction, to synchronize a transmission input with a torque generated by the electric machine.

* * * * *